March 5, 1963    J. A. GRANT    3,079,664
COATED GLASS FIBER COMBINATIONS
Original Filed Nov. 9, 1953

INVENTOR.
JOHN A. GRANT
BY
ATTORNEYS

United States Patent Office 3,079,664
Patented Mar. 5, 1963

3,079,664
COATED GLASS FIBER COMBINATIONS
John A. Grant, Newark, Ohio, assignor to Owens-Corning Fiberglas Corporation, a corporation of Delaware
Original application Nov. 9, 1953, Ser. No. 391,054, now Patent No. 2,915,806, dated Dec. 8, 1959. Divided and this application Mar. 26, 1959, Ser. No. 802,232
2 Claims. (Cl. 28—75)

This invention relates to glass fibers and particularly to glass fibers coated with materials to provide strands, yarns and other textiles having increased wear or abrasion resistance and increased flexural life.

This application is a division of my co-pending application, Serial No. 391,054, filed November 9, 1953, now Patent No. 2,915,806.

It is well known that glass fibers have extremely high tensile strengths but that at times they are somewhat limited in application by the fact that in general, they have low resistance to forces of abrasion. Bare glass fibers when rubbed against each other produce surface scratches which result in considerable reduction in tensile strength. In other words, the usable strength is often too low for specific applications. As an example, strands made of a plurality of bare glass fibers have tensile strengths practically equal to a multiple of the tensile strength of an individual fiber, but when such a strand is worked, as by flexing, or by twisting and plying, abrasion occurs at the interfaces of the fibers to inflict surface damage such that the tensile strength of the combination of fibers is greatly reduced. With a product such as this, the flexural life, or the number of times the strand may be flexed is quite limited.

It has been found that glass fibers may be coated with materials such as metals and resins to protect the surface and thereby retain the tensile strength of the fibers and at the same time greatly increase the flex life of groupings of fibers incorporated in a product. A long flex life is particularly desired in instances when glass fibers are to be utilized in yarns, cords, and ropes, or in fabrics such as sail cloth, awning material or tire cords where the material is subjected to considerable movement resulting in substantial wear at the interfaces of the fibers.

The wear properties at the interface of two surfaces of the same material, however, are not always ideal or even desirable. For instance, it is well known in the field of bearing manufacture that a steel face acting against another steel surface does not produce a good bearing interface. Correspondingly, a bronze surface against another surface of the same bronze does not provide a particularly good bearing interface. A bronze surface against a steel surface, however, results in an excellent bearing interface combination. This combination results in better bearing characteristics than when only one of the two metals is used in each of the contacting surfaces forming an interface. One advantage of the use of dissimilar metals is that frequently galling and seizure can be minimized. Use of one material in a combination with a high elastic limit is also a method by which plastic deformation may be reduced to prevent seizure under pressure. The use of one metal in a combination having a lubricating film or oxide coating, or a sulfide, chloride or phosphate coating has also been found to be helpful in improving the life of surfaces acting against each other. Resins such as polyethylene, tetrafluoroethylene, or a polyamide can also be applied to the glass fibers with similar results. Such resin coated fibers can be combined in textile forms with metal coated fibers or with other resin coated fibers such as phenolic coated or polystyrene coated fibers for relatively similar results.

In view of the foregoing, it is an object of this invention to provide a strand of glass fibers coated with dissimilar and complementary surface materials such that upon being grouped in such products as strands, yarns, and other textiles, improved wear properties are imparted to the product.

It is another object of this invention to provide a coating for glass fibers for protection of their surfaces and to permit formation of groupings of the glass fibers having dissimilar coating materials and thereby to promote retention of their tensile strength and an increase in their flex life in products and other instances where the fibers are caused to slide against each other when in pressure contact.

It is another object of this invention to provide an economical high speed method of making strands of glass fibers having coatings of more than one type.

It is still another object of this invention to provide a higher abrasion resistance in glass fibers grouped into products by coating the fibers with dissimilar materials having complementary physical properties in resisting damage from abrasion when movement is effected at their interfaces.

A further object of this invention is to provide a fabric made of glass fibers coated with dissimilar materials and so arranged as to impart to the fabric the advantages of increased abrasion resistance of the coating materials.

It is a feature of this invention that the application of coating materials to the glass fibers may be effected in the fiber-forming operations, thereby eliminating the need for treatment on a special handling basis and promoting economical production of coated fibers.

It is another feature of this invention that coating materials may be applied to the fibers at any of a range of temperatures in the fiber-forming operations, thus making the coating procedure flexibly adaptable to selectively impart a wide range of physical relationships between the coating material and glass fibers.

Other objects and features which I believe to be characteristic of my invention are set forth with particularity in the appended claims. My invention, however, both in organization in manner of construction together with further objects and advantages thereof may be best understood by reference to the following description taken in connection with the accompanying drawings in which:

Figure 1:
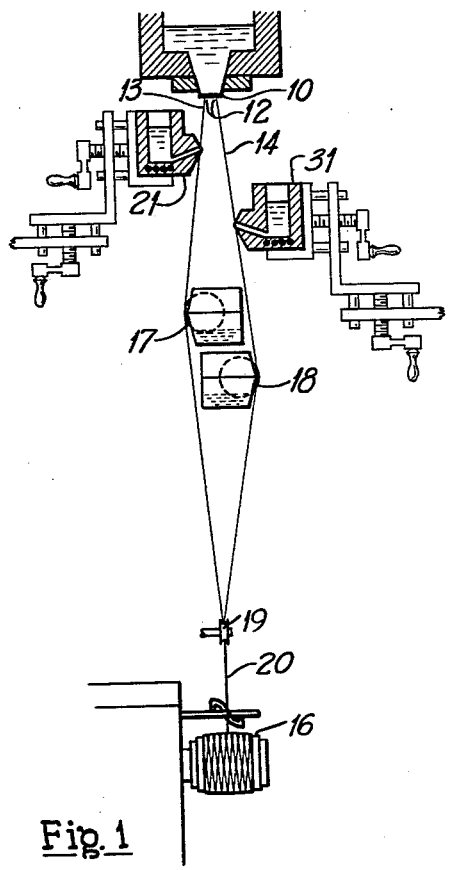
FIGURE 1 is a schematic side elevational view of an arrangement of apparatus for forming metal-coated glass fibers or filaments for incorporation in a strand made in accordance with the present invention.
Figure 2:
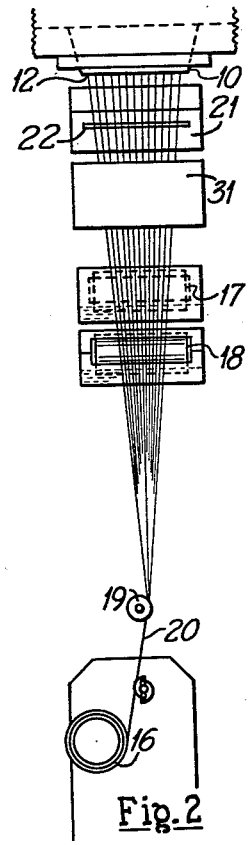
FIGURE 2 is a partially broken away front elevational view of the apparatus shown in FIGURE 1.

The principles of the present invention have been chosen to be explained herein with regard to a method by which metal may be coated on glass fibers during forming. Turning to the drawings in detail, FIGURES 1 and 2 show a general layout of fiber-forming and metal-coating apparatus including a suitable receptacle and feeder 10 for molten glass that may be heated in any conventional manner. The feeder 10 is provided with a series of outlets 12 in its bottom from which flow a plurality of streams of molten glass. Preferably, the outlets are all arranged in one or two rows so that the streams as they flow from the outlets can be readily divided into two separate groups of fibers 13 and 14 for application of separate metals thereto. If desired, however, more than two rows of outlets may be provided to flow streams that may be divided into groups. As the streams flow from the outlets 12 they are drawn out into fibers or filaments 13 and 14 by means of a rotating drum or a collet supported tube 16 which winds the strand while pulling on the filaments to draw out the streams.

A pair of separator rollers 17 and 18 which form a more positive division between the filaments 13 and 14 and a spinner-type gathering member 19 for collection of the filaments into a group or strand 20 are provided in positions intermediate the source of the streams of molten glass and the forming tube 16. Sizing materials may be applied to the filaments at the separator rolls 17 and 18. Sizing materials such as that set out in United States Patent 2,234,896 issued on March 18, 1940, or sizing materials which are predominantly lubricant in nature, such as petroleum oil, vegetable oil, molybdenum disulfide, or other recognized lubricants for metal may be used.

After the strand is formed, other treatment such as finishes might be applied to adapt it to specific uses. For instance, when the strand is to be used as reinforcement for products made of material such as rubber, plastics and the like, a finish which makes the strand compatible with the material wtih which it is combined is used. As an example, when combining metal-coated fibers with rubber, a finish is often used having one component common to both the adhesive and the finish. More specifically, if the adhesive has resorcinol formaldehyde latex as one of its constituents, then the finish likewise may have RFL as an ingredient.

The apparatus for applying metal to the fibers as they are formed comprises a pair of similarly constructed applicators 21 and 31. Each applicator has a graphite face over which the attenuated filaments pass as they are being coated. The metal in each of the applicators is maintained in a molten condition by heating units such as electrical resistant elements conductors of which are embedded within a suitable electrical insulation layer such as refractory cement or silicate fibers. The heater units are each provided wtih external terminals for connection to a suitable power source.

The interior of the applicators are lined with graphite or similar material capable of withstanding the temperature of the molten metal to be contained. A channel within each of the units provides a path between the main body of the molten metal and the metal coating face. The metal flows from a slot at the face, such as slot 22, to form a longitudinal glob or strip of molten metal capable of enveloping each of the filaments passing therethrough. The slot is made sufficiently thin that the strip of metal emitted therefrom has a surface tension developed therein which provides sufficient retaining force to prevent free flow of the molten metal from the unit and which also suspends the strip in the space in front of the face without external support. Vertical grooves are provided in the face of the applicators to accommodate the filaments passed over the respective faces to permit them to pass through the molten strip or globule of metal closer to its base to assure positive envelopment of the filaments.

Coating of metal on fibers in this manner permits unobstructed filament passage over the faces of the applicators through the grooves and additionally eliminates the need for modification of the fiber-forming methods generally in use.

The average temperaturee of molten glass in the manufacture of most glasses used in textile fibers is in the order of 2200° F. At a point some distance below the feeder outlets 12, this temperature drops to that of the surrounding atmosphere. By reason of extension of the drop in temperature of the filaments over an appreciable distance, a range of temperature levels exists from which a selection may be made for application of specific metals under most advantageous conditions. It has been found that the relationship of the temperature of the metal to the temperature of the glass at the point of application of the metal is quite important since the strength of the glass fibers may be impaired by extremely high metal temperature if the proper relationships are not established. Thus, the level at which the applicators 21 and 31 apply the respective materials contained therein may be different depending upon the melting characteristics and physical properties desired of the materials.

Correspondingly, the application of sizing materials by roller separators 17 and 18 may be done at different levels below the point of application of metals to the filaments. It should be noted, however, that if the metals to be applied to the two groups of filaments are adapted to application at the same temperature levels, they may be supplied from a common unit with two coating faces located between the groups, thereby making it unnecessary to dispose the roller separators between the two groups. That is, a common metal applicator unit could be made to function as a separator unit as well as an applicator unit, thereby permitting application of sizing material from the exterior of the two fans of filaments, if desired.

Although the application of metal to glass fibers is herein described as being applied by drawing the filaments through molten metal during forming, it will be readily recognized that metal can be applied to such fibers by other more conventional means. Metal coatings can be applied to glass fibers by evaporation methods, plating methods, as well as chemical reduction and spray methods. Utilization of such other methods, however, usually entails more time and apparatus than the method herein described, but nevertheless are adaptable to production of fibers with coatings of different metals. The metals in such instances are usually applied to the fibers after forming by separate treatment.

In tests of the factors involved in the selection of proper coating metals for combination within a strand, it has been discovered that they simulate closely those involved in the selection of metal combinations in the bearing art. Tests of flex life of glass strands with different metals reveal that flex life is considerably higher when the coefficient of friction is low at the interface of the materials on the individual fibers. Other properties of metal which operate with low friction to improve the wear life of abrading or rubbing surfaces are the anti-welding characteristics and compressive strength. In glass fiber products such as rope or fabric materials for sail cloth, awnings, or tire cords where considerable flex working is encountered, the ability of the coating material to conform to contours at its interface, in other words, its modulus of elasticity, is an important factor. A further and highly important factor is the metallurgical structure of the materials, particularly at the interface. For each metal coating material, there is a particular molecular or crystalline arrangement which is better in performance under a given set of fiber working conditions.

In view of the fact that wear life is a function of the coaction of all these factors, each of which is a complicated phenomenon when considered alone in detail, it will be apparent that a universal optimum material or combination of materials will not readily be found. By proper selection of dissimilar complementary materials, however, the wear life of groupings of glass fibers, such as in strands, fabrics and cord products, can be increased appreciably over the life of corresponding products made of fibers coated with either material of such combinations alone. The selection of combinations, providing improved wear life, however, usually entails a trial and error mating for each specific application based on previous wear experiences and knowledge available from the bearing art.

Figure 3:
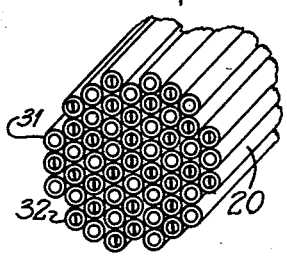
FIGURE 3 is a perspective view of the end of a strand made up of fibers coated with dissimilar materials.
Figure 3A:
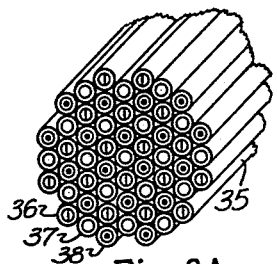
FIGURE 3a is a perspective view of the end of a strand of oriented fibers coated with three dissimilar materials.

FIGURE 3 shows a strand 20 of glass fibers each of which is individually coated with a material, but some of the fibers being coated with one material 31 such as zinc while the remainder are coated with another material 32 (designated by a line through the glass core) selected for its complementary, physical characteristics in providing long wear life to the strand. Similar coatings on filaments of each of the strands shown in FIGURES 3 and 3a are distinguished by dot and dash identification marks as well as the absence of marks on the ends of the glass filaments. It will be noted here that the fibers are grouped together in somewhat random arrangement within the strand which on consideration will indicate that a maximum number of interfaces of dissimilar materials will not always be provided. The increased life of such randomly grouped fibers, however, is submitted to be a result of the fact that at least some of the interfaces being formed by contact of dissimilarly coated fibers results when fibers coated with one material are located on one side of a line passing through the strand while all fibers coated with another material lie on the opposite side. The greater the distribution in random arrangements other than this definite division, the larger is the number of interfaces formed by contact of dissimilarly coated fibers, and correspondingly is the wear life prolonged. The increased wear properties of coated fibers are particularly desirable in production of yarns wherein the fibers are subjected to the forces of twisting and plying.

Metals that may be applied to glass fibers and combined in product groupings of coated fibers as wear resistant combinations include zinc, copper, aluminum, nickel, tin, lead, alloys of these metals and others. For example, zinc which has a melting point of 786° F. and a hardness of approximately 100 Brinell can be coated on glass fibers and advantageously associated for wear with fibers coated with a tin base alloy such as Babbitt metal having a composition of 65.5% tin, 18.2% lead, 14.1% antimony and 2% copper having a melting point of 358° F. and a hardness of about 23 Brinell. Additional metal combinations which may be cited as examples include heavy duty lead base Babbitt with zinc base bearing alloys, stainless steel with leaded tin bronze, aluminum base alloys and bronze, steel and graphite bronze and numerous others. In view of the range of physical properties obtainable in the different types of alloys falling within broad classifications such as zinc base alloys, combinations of alloys complementary in physical properties but of somewhat similar compositions will often provide desirable increase in wear resistance.

The oxides or other compounds of the metals when formed on the coating surface often give an increased wearability. The incorporation of one metal that forms a sort of lubricating film or a thin coat of sulfide, chloride or phosphate often has this effect and the selection of combinations are made with these facts in mind. It is also possible in many instances to plate one metal with indium to increase wear resistance. Indium has an additional advantage in that it protects against corrosion.

It should be noted that improved wear life according to the present invention is not necessarily limited to mating of metals only, but the principles are intended to be extended to metals complementarily mated with other materials such as graphite coated on glass as by drawing the fibers through wax and then applying graphite particles, as well as to mating of other dissimilar non-metallic materials adapted to providing long contact life as bearing-like combinations.

FIGURE 3a shows a strand 35 with an oriented arrangement of fibers coated with three different materials illustrating how all interfaces of the fibers can be formed by contact of different materials to prolong wear life. Three types of interfaces exist in the arrangement; one formed by contact of fibers coated with materials 36 and 37, another by fibers coated with materials 37 and 38, while the third is formed by fibers coated with materials 38 and 36. It should be noted in this arrangement that one of the groups of fibers might be left bare without deviating from the principles of the invention.

Figure 4:
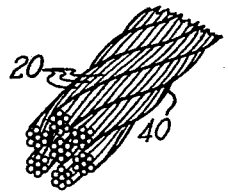
FIGURE 4 is a perspective view of the end of a cord made up of glass filaments coated with dissimilar materials.

FIGURE 4 shows a glass fiber cord 40 made of twisted strands of the type shown in FIGURE 3. It will be recognized that the number of interfacial contact points between the dissimilar material will tend to be greatly multiplied by twisting of the individual strands, and that the further twist of the strands over each other will promote even more approach to a maximum number of such contact points between dissimilar materials.

Figure 5:
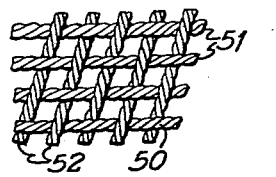
FIGURE 5 is a view of a piece of woven fabric made of strands of glass fibers coated with dissimilar materials.

FIGURE 5 shows a woven fabric 50 made in accordance with the principles of this invention including yarns incorporating filaments coated with two different materials. It is to be understood that the fabric may be woven of yarns made of strands similar to that shown in FIGURE 3 and that the maximum number of interfacial contacts by dissimilar materials will be promoted by the approach to thorough distribution as in the cord of FIGURE 4, but as illustrated in the present instance, the fabric has been shown as woven with yarns each of which has all of its filaments coated with the same material. Thus, the yarns 51 woven in one direction have fibers coated with one material while the yarns 52 extending crosswise at a 90° angle thereto comprise fibers coated with another material complementary to the first to provide improved wearability. The crossover points of yarns on this fabric, it will be noted, are all formed by an overlay or contact of yarns of the dissimilar materials, and tendencies toward contact by portions of yarn surfaces of similar coating materials are almost negligible in view of the form of the weave. Thus, the increased wear afforded by contact of dissimilar materials is positively incorporated in the fabric.

In view of the various illustrated forms in which fibers of dissimilar materials can be incorporated for increased wear of glass fibers in textile products, it is apparent that the basic principles of this invention have broad application in improving the wearability of the coated glass fibers.

While I have shown certain particular forms of the invention, it will be understood that I do not wish to be limited thereto since many modifications may be made within the concepts of the invention, and I therefore contemplate by the appended claims to cover all such modifications that fall within the spirit and scope of the invention.

I claim:

1. The method of producing a fibrous textile product with improved wearability comprising individually coating some of the fibers with one material and the other fibers with a material complementary in wearability to the one material and then grouping the two groups of dissimilarly coated fibers together into a single textile product.

2. The method of producing a fibrous textile product with improved wearability comprising individually coating some of the fibers with one metal and the other fibers with a material complementary in wearability to the one metal to improve wearability of the fibers in moving contact with each other and then grouping the two groups of dissimilarly coated fibers together into a single textile product.

(References on following page)

References Cited in the file of this patent

UNITED STATES PATENTS

| | | |
|---|---|---|
| 1,659,977 | Kingman | Feb. 21, 1928 |
| 1,830,792 | Herrmann | Nov. 10, 1931 |
| 2,133,237 | Slayter | Oct. 11, 1938 |
| 2,272,588 | Simison | Feb. 10, 1942 |
| 2,450,047 | Kloeckener | Sept. 28, 1948 |
| 2,457,775 | Edaugh | Dec. 28, 1948 |
| 2,720,076 | Sachara | Oct. 11, 1955 |
| 2,797,469 | Kahn | July 2, 1957 |
| 2,886,470 | Park et al. | May 12, 1959 |
| 2,895,789 | Russell | July 21, 1959 |
| 2,930,105 | Budd | Mar. 29, 1960 |
| 2,934,458 | Budd et al. | Apr. 26, 1960 |

FOREIGN PATENTS

| | | |
|---|---|---|
| 1,593 | Great Britain | of 1853 |